3,119,830
PRODUCTION OF SATURATED ALIPHATIC SULFONAMIDES

James Gordon Burt, East Nottingham Township, Chester County, Pa., assignor to E. I. du Pont de Nemours and Company, Wilmington, Del., a corporation of Delaware
No Drawing. Filed Feb. 15, 1961, Ser. No. 89,373
8 Claims. (Cl. 260—293.4)

This invention relates to the production of aliphatic sulfonamides from alsyl products, as defined below. It is an object of this invention to provide an improved process for the preparation of alsyl sulfonamides of improved quality and with great economy. Other objects and achievements of this invention will appear as the description proceeds.

The term alsyl products as used in this specification and claims refers to mixtures of chlorosulfonylated alkanes and chlorosulfonylated chloroalkanes as obtained by passing a gaseous mixture of sulfur dioxide and chlorine into a liquid (or liquefied) saturated aliphatic or cycloaliphatic hydrocarbon mixture while irradiating said liquid mixture with actinic light. See for instance, Re. 20,968 and U.S.P. 2,046,090; 2,202,791 and 2,462,999.

The composition of an alsyl product is generally difficult to define with precision. Firstly, the initial material itself is generally a petroleum fraction, and therefore consists of a mixture of alkanes of various chain-lengths and may include straight-chain alkanes branched-chain alkanes, and cycloalkanes, for instance "the naphthenes." Secondly, the alsylation process may introduce more than one $SO_2Cl$ group in any particular alkane molecule (and may skip others altogether), and it generally effects replacement of alkane hydrogen by chlorine to a not generally predictable degree, in which process again the number of Cl-atoms entered per molecule and their positions may vary from one molecule to the next. Accordingly, alsyl products are usually defined in the art by stating the boiling range and viscosity of the initial petroleum fraction and the sulfur and chlorine analyses of the product.

One limitation is generally accepted as understood in the art of alsyl products, namely, that the initial material is essentially free or made to be essentially free of olefinic components or other forms of unsaturation. In addition, the practical interest of my present invention does not extend to alsyl products having, on the average, less than 12 or more than 30 C-atoms.

Processes for converting alsyl products into sulfonamides have been set forth in U.S. Patents 2,334,186 and 2,361,188. In these processes, as well as in sulfonamide formation in general from corresponding aliphatic sulfonyl chlorides and various amines, the reaction is accompanied by the elimination of hydrogen chloride, and it is necessary to neutralize this acid if the reaction is to go to completion.

Processes of manufacture hitherto practiced have employed an excess of the amine as acid absorbing agent, or have added a tertiary amine, for instance pyridine, for this purpose. This practice, however, is costly and furthermore presents the problem of subsequent separation of the amine salts and the recovery of the excess amine. This practice is particularly troublesome when the amine employed as reactant or as acid-binding agent is of high molecular weight, because of the low volatility and limited water solubility of the resultant hydrochlorides.

Most of the methods heretofore employed have also been slow and have required prolonged reaction times or elevated temperatures, or both, to complete the reaction. These two factors, however, tend to hydrolyze the initial sulfonyl chloride and therefore necessitate reaction under strictly anhydrous conditions. Thus, while aqueous sodium hydroxide has been used as acid binding agent in the manufacture of aryl sulfonamides, and while it might appear as a logical remedy to the economic problem of absorbing the acid formed in the reaction under discussion, its use has been precluded heretofore by said necessity of maintaining anhydrous conditions and by the tendency of sodium hydroxide to increase the rate of hydrolysis of the sulfonyl chloride, especially in its crude form as obtained directly from the alsyl reactor.

An additional and very material problem exists in the case where the initial sulfonyl chloride compound is an alsyl product, as above defined. By virtue of their mode of preparation, the crude reaction products obtained in the alsyl process are as a rule contaminated with free $SO_2$ and HCl. In processes as heretofore practiced or suggested for the making of sulfonamides, the mentioned crude has to be subjected to special purification procedures such as vacuum stripping, blowing, washing, etc. Not only do such procedures add to the cost of the ultimate product, but they themselves introduce an inevitable degradation factor into the product being purified.

The point is that alsyl products have a strong tendency to darken rapidly upon standing, presumably, due to spontaneous formation of some coloring materials. While a freshly prepared alkane sulfonyl chloride may be water-white, it may assume a mahogany brown after standing for several hours, and may turn pitch black within 48 hours. Obviously, the mentioned purification treatments involve a time factor, and the result is that by the time the product has been freed of acidity it may have developed an objectionable degree of darkening. Such coloration is eventually transmitted to the ultimate sulfonamide product.

Now according to my invention, the above special problems and dilemmas are eliminated, and an economical synthesis process for producing high-quality sulfonamides from alsyl products is obtained, by arranging the process of mixing the reacting materials in a particular sequence and manner as detailed below.

According to my invention, the alsyl product and selected amine are first mixed together in essentially theoretical proportions, in any convenient manner. For instance, if the amine is liquid at room temperature, and since the alsyl products are generally liquid when their average chain length is in the range of 12 to 30 C-atoms, the two liquids may be simply brought together in the same vessel in any suitable sequence or manner. If the amine is gaseous (for instance, dimethylamine), it may be bubbled into the liquid $R-SO_2Cl$ compound until about one mole thereof has been absorbed by the liquid per mole of the latter.

If the amine is liquid, gaseous or solid but soluble in water, an aqueous solution thereof may be added to the liquid $R-SO_2Cl$ mass. An analogous procedure may be employed, if the amine is soluble in an organic solvent which is inert toward the $R-SO_2Cl$ compound, for instance an aliphatic or aromatic hydrocarbon, o-dichlorobenzene, nitrobenzene, carbon tetrachloride, etc.

I then add a quantity of aqueous alkali-metal hydroxide, for instance NaOH or KOH, calculated to give the reaction mass in the end a pH of 8 or higher. This implies adding sufficient alkali to neutralize any free acidity in the initial alsyl product and to absorb all the HCl liberated in the reaction.

The free acidity in an alsyl product is apt to consist of occluded residual $SO_2$, and possibly also HCl. Its quantity can be estimated in advance by analysis. Alternatively, the reaction mass may be tested repeatedly with indicator paper during the course of addition of the alkali, to insure that sufficient alkali has been added to produce and maintain in the mass a pH of 8 or higher.

The aqueous alkali, however, is not added all at once.

Instead, it is stirred in at a rate sufficiently slow to prevent the temperature of the reaction mass from rising above 40° C. Cooling may be resorted to, if desired, to bring the temperature down to say 10° C. The reaction mass is stirred during the addition of the alkali, to prevent too high local accumulations of alkali. In this fashion, the hydrolytic effect upon the R—SO₂Cl compound is reduced to a minimum.

The entry of the alkali into the reaction mass causes the latter to turn into an emulsion (presumably of the water-in-oil type) which persists throughout the reaction period. When reaction is complete, which will generally occur in about 3 hours after the beginning of the alkali feed, the reaction mass may be treated to recover therefrom the aliphatic sulfonamide.

The nature of my synthesis process affords a very simple and economical method for achieving recovery. The reaction mass is heated up to say between 85° to 100° C. and acidified to bring down the pH to a value not exceeding 8. The pH may be brought down to as low as 3, but a final pH of 7 to 8 is preferred. The acidification may precede the heating, or the acid may be added during the heating. The heating and reduction in pH act together to break the emulsion. The mass is then allowed to settle while hot into layers, and the aqueous layer may be drawn off and discarded.

The liquid organic phase, which contains the desired sulfonamide, is now subjected to one or more purification steps which are essentially of the same nature as the principal recovery step just described. That is, a quantity of water is added to the organic phase, with stirring, to produce an emulsion. The emulsion is heated to between 85° and 100° C. and its pH is again adjusted (usually with acid) to a value between 7 and 8. The mass is then allowed to settle while hot, and the water-layer is drawn off.

The product obtained constitutes the desired aliphatic sulfonamide in a high state of purity and satisfactory yield. Depending on the nature of the amine component, it possesses various degrees of capillary activity, and may be used—alone or in admixture with other substances—in the fields of wetting, foaming, dispersing and cleansing agents. Some are also useful as petroleum chemicals, for instance as additives to motor fuels, or as plasticizers.

It will be observed that by proceeding in the manner above outlined I achieve the reaction in a relatively short time, at moderate temperatures, without substantial hydrolysis of the initial alkanesulfonyl chloride, and without using any excessive quantities of the amine or adding tertiary amines. I thus save not only the cost of such excess or added amines but also the troublesome problem of separating their salts from the reaction mass. While resorting to the use of aqueous sodium hydroxide, which is a sufficiently cheap reagent to discard at the end of the reaction, I use it at a stage where its hydrolytic effect on the reactants is at a minimum. Furthermore, my process lends itself neatly to a recovery procedure which is simple, inexpensive of energy and not wasteful of any valuable materials.

Moreover, in my invention, the crude alkane sulfonyl chloride from the alsyl reaction is adapted for use directly, without removing therefrom mineral acidity. Thus, I have found that mixing of the alsyl product with an amine (in substantially theoretical proportions) for some reason arrests the discoloration.

Accordingly, where an alsyl product is intended for sulfonamide production, my invention makes it possible to stabilize the same in water-white state by mixing therewith the intended amine immediately upon completion of the alsyl reaction. The mixture may then be stored or shipped for conversion into sulfonamide, by treatment according to this invention, at any convenient future date, with the assurance that a light colored sulfonamide product will be obtained.

As amine for the purposes of this invention may be used any organic amine of formula

which is capable of reacting with an aliphatic sulfonyl chloride to produce the corresponding sulfonamide. Thus, the radical

may represent the radical of primary or secondary aliphatic, araliphatic or aromatic amine or the radical of a cyclic secondary amine such as piperidine. In particular, R' may be defined as designating hydrogen or a lower alkyl radical (1 to 4 C-atoms); R'' may be an alkyl radical of 1 to 20 C-atoms, an aralkyl radical such as benzyl, a mononuclear aromatic radical such as phenyl, its homologs and nuclear halogen derivatives; or R' and R'' may jointly represent a divalent alkane radical such as the group —(CH₂)₅— in piperidine.

The aforementioned theoretical quantity of amine to be employed is the quantity stoichiometrically equivalent to the SO₂Cl content of the initial material. Inasmuch as the latter is often difficult to determine in view of the complex nature of the alsyl product, the theoretical quantity of amine required is best determined experimentally. For instance, a series of amidations may be run with different quantities of an amine upon equal-weight samples of the alsyl product that is intended for use in production. Following each amidation, the product is washed with water to remove therefrom by-product ionizable salts, dried and weighed. The weight of dry sulfonamide obtained is divided by the weight of amine employed, and the ratio is plotted against the latter. Then, the quantity of amine which produces the maximum of the curve, when divided by the weight of initial alsyl product, is taken as the theoretically required quantity of the amine per unit weight of initial alsyl product.

It will be noted, however, that absolute precision in the quantity of amine selected is not required. The whole subject is purely one of economy. Where the amine is relatively cheap, an excess thereof, say up to 20% by weight, may be employed. On the other hand, deficiencies of the amine should be avoided, and should not in any event be greater than 5% by weight.

Without limiting this invention, the following examples are given to illustrate my preferred mode of operation, parts mentioned are by weight.

*Example 1*

79 parts of a petroleum white oil fraction (boiling range, 284° to 342° C.; sp. gr., 0.810, and Saybolt Universal viscosity, 36 at 100° F.) are treated simultaneously with 31 parts of gaseous chlorine and 62 parts of gaseous sulfur dioxide, at 35° C., while being irradiated with actinic light, as described in Example 1 of U.S.P. 2,408,300. An alsyl product results which has a sp. gr. of 0.955 and analyzes 6.6% S and 9.6% Cl.

To the reaction mass obtained above, which now weighs about 100 parts (in the same units as the initial material) are added, in a slow stream, 34 parts of a commercial mixture of tertiary dodecylamines, and optionally 10 to 30 parts of water, with cooling, to maintain the temperature below 50° C.

A solution of 15 parts of sodium hydroxide in 40 to 140 parts of water is now fed in slowly over a period of 3 hours, while stirring the reaction mass and maintaining its temperature at 30° to 35° C. The physical state of the reaction mass changes into an emulsion during this period, and can be made more fluid, if desired, by adding more water. When all the alkali has been entered, the mass is preferably stirred for another hour at a temperature not exceeding 35° C., and is then heated to 95° C. Dilute sulfuric acid is now fed in slowly until the pH of the mass drops to a value below 8, preferably between 7 and 8. The heating and reduction of pH serve to break the emulsion, whereupon the mass is allowed to rest, while hot, to settle into layers. The hot aqueous layer (which is below) is withdrawn and may be discarded.

To the residual oily layer 100 parts of water are now added, with agitation, which produces again an emulsion. The mass is then heated again to 95° C., and about 5 parts of dilute sulfuric acid (10%) are fed in until the mass becomes just neutral or faintly alkaline to Brilliant Yellow paper (pH 8). The mass is again allowed to settle while hot and the water-layer is removed.

The oily layer may be again subjected once or twice to the aforegoing modified washing treatment, acid being added in each step if needed, to the extent above indicated.

Finally, the recovered oily layer may be dried by heating to 105° C. while passing through it a nitrogen sweep. A dry organic sulfonamide of the formula

R—SO$_2$NH—C$_{12}$H$_{25}$ is obtained, wherein R represents a mixture of alkyl and chloroalkyl radicals of probable C-content from 16 to 20.

The following examples give the details and results of several experiments performed in the above manner using various amines. In each example, 100 parts of the same alsyl product as in Example 1 were employed.

*Example 2*

Amine employed.—An aqueous solution of 8.3 parts of dimethylamine.
Recovered.—56 parts of sulfonamide.
Analysis.—6.0% S.

*Example 3*

Amine employed.—Aniline, 16 parts.
Recovered.—103.5 parts of sulfonamide.
Analysis.—6.1% S.

*Example 4*

Amine employed.—1,1,3,3-tetramethylbutyl amine, 21 parts.
Recovered.—95 parts of sulfonamide.
Analysis.—4.3% S.

*Example 5*

Amine employed.—Commercial tertiary dodecylamine (same as in Example 1), 34 parts.
Recovered.—107 parts of sulfonamide.
Analysis.—4.0% S.

*Example 6*

Amine employed.—A commercial mixture of C$_{18}$ to C$_{21}$ alkyl amines, 50 parts.
Recovered.—135 parts of sulfonamide.
Analysis.—3.7% S.

*Example 7*

By following the procedure described in Example 1, 74 parts of deodorized kerosene (boiling range 190° to 250° C.; sp. gr. at 20° C.; and containing alkane molecules of 10 to 14 carbon atoms) are treated with 25 parts of gaseous chlorine and 52 parts of gaseous sulfur dioxide at 35° C., while being irradiated with actinic light. An alsyl product results which has a sp. gr. of 0.92. To the reaction mass are added 41 parts of a commercial mixture of tertiary dodecylamines, and optionally 10 to 30 parts of water, with cooling to maintain the temperature below 50° C. A solution of 19 parts of sodium hydroxide in 60 parts of water is then fed in slowly, over a period of 3 hours.

101 parts of a sulfonamide (4.9% S) are obtained of the formula RSO$_2$NHC$_{12}$H$_{25}$, wherein R represents a mixture of alkyl and chloroalkyl radicals having 10 to 14 carbon atoms.

In a similar manner other saturated aliphatic sulfonyl chlorides may be converted into sulfonamides with various amines. As illustrations of conveniently available sulfonyl chloride compounds may be mentioned those derived from dodecane, hexane, octadecane, eicosane, as well as the alsyl products derived from paraffin, petrolatum, white oil, and mixtures of the same.

As additional examples of suitable amines may be mentioned N-methylaniline, benzylamine, N-methyl benzylamine, laurylamine, cocamine, n-hexadecylamine, n-butylamine, tert.-butylamine and piperidine.

The concentration of the aqueous sodium hydroxide employed may vary, as most convenient, say from 5% to 50% by weight. The upper limit represents more or less the highest concentration easily processable in large scale production.

The temperature of the reaction may be anywhere from 10° to 40° C. But the most satisfactory range is from room temperature (about 20° C.) to 35° C.

I claim as my invention:

1. In the process of producing an aliphatic sulfonamide by reacting an alsyl product with an organic amine having at least one hydrogen atom on the amine radical, said alsyl product being a mixture of chlorosulfonylated alkanes and chlorosulfonylated chloroalkanes as obtained by reacting with a gaseous mixture of sulfur dioxide and chlorine under the influence of light upon a mixture of alkanes having an average chain length of 12 to 30 C-atoms, the improvement which consists of mixing said alsyl product essentially at room temperature with essentially the theoretical quantity of an organic amine required for amidation of all its sulfonyl chloride content, said amine having the formula

where R' is selected from the group consisting of hydrogen and an alkyl radical of 1–4 carbons, R" is selected from the group consisting of an alkyl radical of 1–20 carbon atoms, phenyl and benzyl, R' and R" may jointly represent the divalent alkane radical —(CH$_2$)$_5$—, adding an aqueous solution of an alkali-metal hydroxide in quantity sufficient to produce and maintain in said mixture an alkalinity of at least pH 8, and stirring the mass at a temperature between 10° and 40° C. until reaction is essentially complete.

2. A process improvement as in claim 1, wherein said organic amine is one which is liquid at room temperature.

3. A process improvement as in claim 1, wherein said organic amine is one which is a gas at room temperature but is soluble in the alsyl product to which it is added.

4. A process improvement as in claim 1, wherein said organic amine is one which is soluble in water and is added in the form of an aqueous solution.

5. A process improvement as in claim 1, wherein said organic amine is one which is soluble in an organic solvent which is inert toward said alsyl product, and is added to the latter in the form of a solution in such a solvent.

6. A process improvement as in claim 1, wherein the alkali-metal hydroxide is sodium hydroxide.

7. A process improvement as in claim 1, wherein the alkali-metal hydroxide solution is fed into the mixture of said alsyl product and said amine at such a rate as to prevent the temperature of the reaction mass from rising above 40° C.

8. A process as in claim 1, wherein the reaction mass is heated, at the end of the reaction, to a temperature between 85° and 100° C. while its pH is adjusted by the aid of acid to a value between 3 and 8, to break the emulsion, and this treatment is followed by separation of the organic phase from the aqueous phase.

References Cited in the file of this patent

UNITED STATES PATENTS

| | | |
|---|---|---|
| 1,993,722 | Kyrides | Mar. 5, 1935 |
| 2,334,186 | Fox | Nov. 16, 1943 |
| 2,361,188 | Fox | Oct. 24, 1944 |

OTHER REFERENCES

Bergmann: The Chemistry of Acetylene and Related Compounds, page 80 (1948).